United States Patent
Petersen et al.

(10) Patent No.: US 8,936,308 B2
(45) Date of Patent: Jan. 20, 2015

(54) AIRCRAFT SEAT WITH FABRIC SEAT BACK TRAY

(75) Inventors: Neal Gordon Petersen, Kernersville, NC (US); Gregory Michael Molaro, Lewisville, NC (US); Brian James Lasley, Summerfield, NC (US); Joel Brent Bowman, Mount Airy, NC (US); Jason Edward Epley, Winston-Salem, NC (US); David Micheal Cekuta, Summerfield, NC (US); Andrew Edward Kerman, Winston-Salem, NC (US)

(73) Assignee: B/E Aerospace, Inc., Wellington, FL (US)

( * ) Notice: Subject to any disclaimer, the term of this patent is extended or adjusted under 35 U.S.C. 154(b) by 78 days.

(21) Appl. No.: 13/810,770

(22) PCT Filed: Jun. 17, 2011

(86) PCT No.: PCT/US2011/040903
§ 371 (c)(1),
(2), (4) Date: Mar. 12, 2013

(87) PCT Pub. No.: WO2011/160032
PCT Pub. Date: Dec. 22, 2011

(65) Prior Publication Data
US 2013/0169009 A1 Jul. 4, 2013

Related U.S. Application Data

(60) Provisional application No. 61/356,257, filed on Jun. 18, 2010.

(51) Int. Cl.
*B60N 3/00* (2006.01)
*B64D 11/06* (2006.01)

(52) U.S. Cl.
CPC ............. *B64D 11/06* (2013.01); *B60N 3/004* (2013.01); *B64D 2011/0679* (2013.01)
USPC ............... 297/146; 297/163; 297/188.04

(58) Field of Classification Search
USPC .......... 297/146, 163, 188.04, 188.06; 108/25, 108/90
See application file for complete search history.

(56) References Cited

U.S. PATENT DOCUMENTS

| | | | | |
|---|---|---|---|---|
| 4,122,780 A * | 10/1978 | Brickman | .................. | 108/25 |
| 4,466,659 A * | 8/1984 | Carpentier et al. | ...... | 297/188.06 |
| 4,625,655 A * | 12/1986 | Brickman | .................. | 108/25 |
| 5,352,015 A * | 10/1994 | Morgan | .................. | 297/463.1 |
| 6,505,565 B1 * | 1/2003 | Byung et al. | .................. | 108/115 |
| 6,631,950 B1 * | 10/2003 | Madole | .................. | 297/228.11 |
| 6,758,518 B2 * | 7/2004 | Ingram et al. | .................. | 297/146 |
| 6,997,111 B2 * | 2/2006 | Giegerich | .................. | 108/25 |

(Continued)

OTHER PUBLICATIONS

International Search Report for PCT/US2011/040903 dated Nov. 3, 2011.

*Primary Examiner* — Peter Brown
(74) *Attorney, Agent, or Firm* — Shumaker, Loop & Kendrick LLP

(57) ABSTRACT

A seat back tray for being pivotally mounted an aircraft seat, and including a frame mounted on the aircraft seat and movable between a stowed position against a seat back of the aircraft seat and a deployed, generally horizontal position for use by an aft-seated occupant and a fabric sleeve formed of top and bottom panels for being removably positioned in a tensioned condition on and supported by the frame for providing a support surface for use items.

14 Claims, 5 Drawing Sheets

(56) References Cited

U.S. PATENT DOCUMENTS

| | | | |
|---|---|---|---|
| 7,841,658 B1 * | 11/2010 | Marble | 297/224 |
| D699,981 S * | 2/2014 | Kummerfeld et al. | D6/601 |
| 2002/0043826 A1 | 4/2002 | Ingram et al. | |
| 2002/0178975 A1 | 12/2002 | Lewis et al. | |
| 2006/0162623 A1 | 7/2006 | Ciulla | |
| 2008/0156604 A1 | 7/2008 | Franco et al. | |

* cited by examiner

AIRCRAFT SEAT WITH FABRIC SEAT BACK TRAY

TECHNICAL FIELD OF THE INVENTION

This invention relates generally to a tray for use by vehicular passengers. This invention relates more particularly to a fabric tray for mounting to the back of an airline passenger seat for use by a passenger occupying the area behind the seat.

BACKGROUND OF THE INVENTION

A typical airline seat is equipped with a pivotally mounted seat back tray that can be stowed against the seat back and hinged down and away from the seat back into a generally horizontal position for use by a passenger seated aft of the seat. A typical seat back tray has a rigid main panel that serves to support food items and passenger articles. These trays are generally fabricated of a smooth plastic material can be periodically wiped down by airline employees during aircraft cabin servicing between flights, and during scheduled interior cleaning. However, these trays are not easily removed, collected and transported when more thorough cleaning or replacement is desired. A typical seat back tray having a rigid main panel is also not easily customized to match particular color schemes or other appearance options.

BRIEF SUMMARY OF THE INVENTION

Therefore, it is an object of the invention to provide an improved seat back tray to support food items and passenger articles of an aft-seated passenger. Other objects of the invention include providing a seat back tray that is light weight, durable, inexpensive, easily removed and replaced without special tools, and that may be thoroughly cleaned without special facilities.

These and other objects and advantages of the invention are achieved by providing In at least one embodiment of the invention, a tray pivotally mounted to the back of an aircraft seat includes a generally rectangular shaped frame, which is pivotally connected to the back of the aircraft seat, and a tensioned fabric sleeve disposed on the frame and being supported by the frame. The frame is pivotally movable between a stowed generally vertical position and a deployed generally horizontal position. The fabric sleeve defines a tray for supporting articles when the frame is in the deployed position.

These and other objects and advantages of the invention are achieved by providing a seat back tray for being pivotally mounted to an air craft passenger seat, and including a frame movable between a stowed position against a seat back of the passenger seat and a deployed, generally horizontal position for use by an aft-seated occupant, and a fabric sleeve formed of top and bottom panels for being removably positioned in a tensioned condition on and supported by the frame for providing a support surface for use items.

According to one embodiment of the invention, the tray includes at least one releasable fastener for retaining the sleeve on the frame and permitting removal of the sleeve from the frame when desired.

According to another embodiment of the invention, the tray includes an opening formed in at least the top major panel of the sleeve for receiving a cup holder insert therethrough.

According to another embodiment of the invention, the tray includes an opening formed in the top and bottom major panel of the sleeve for receiving a cup holder insert therethrough.

According to another embodiment of the invention, the fastener includes a zipper extending laterally along a side of the sleeve proximate the seat back for retaining the sleeve on the frame.

According to another embodiment of the invention, the sleeve is constructed of a fabric selected from the group consisting of woven, knitted and nonwoven fabric.

According to another embodiment of the invention, an aircraft passenger seat is provided that includes a seat back, and a seat back tray for being pivotally mounted to the passenger seat. A frame is mounted to the seat and is movable between a stowed position against the seat back and a deployed, generally horizontal position for use by an aft-seated occupant. A fabric sleeve is formed of top and bottom panels for being removably positioned in a tensioned condition on and supported by the frame for providing a support surface for use items.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DETAILED DESCRIPTION OF THE INVENTION

Figure 1:
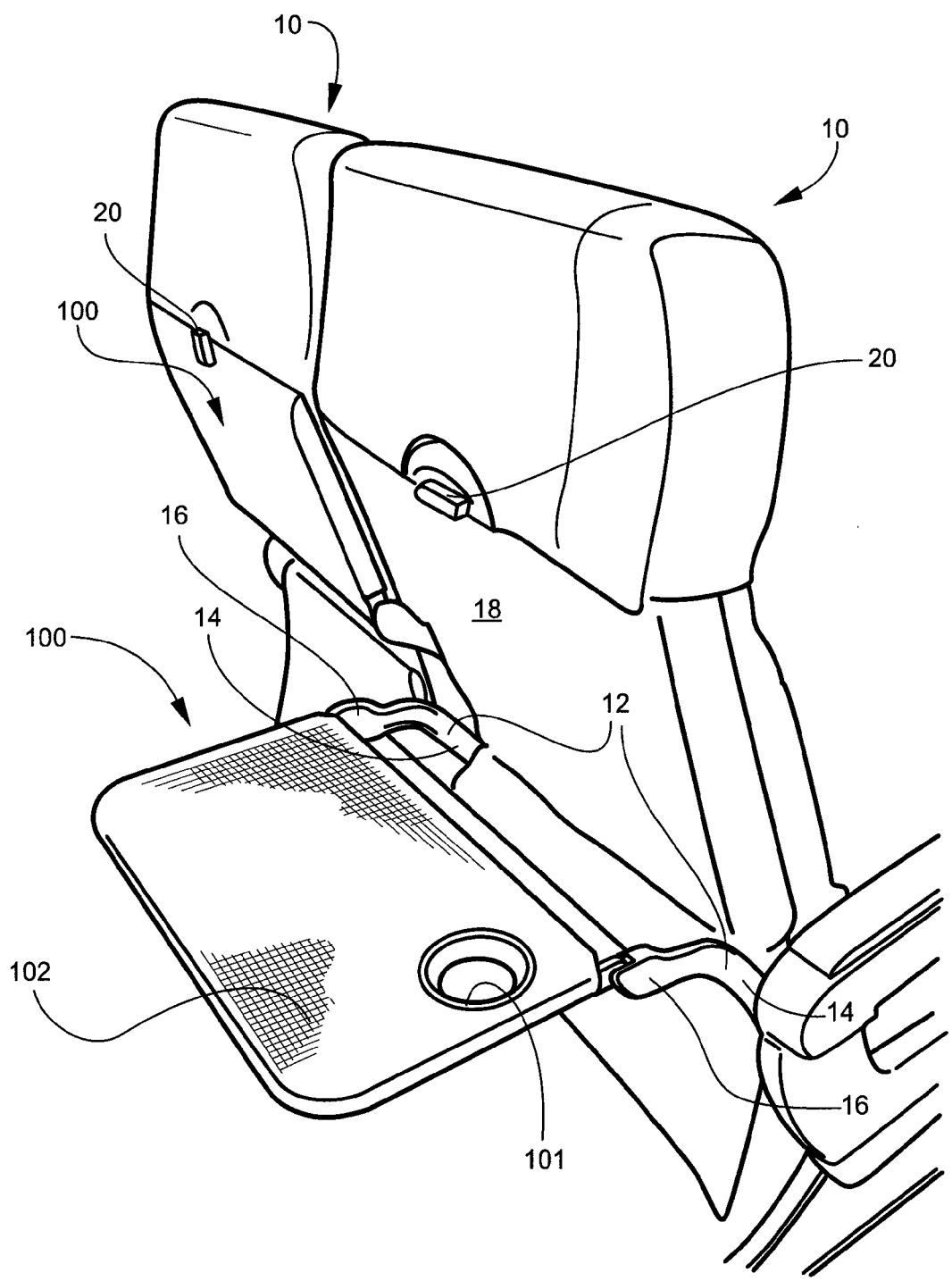
FIG. 1 is a perspective view of an aircraft seat having a fabric seat back tray according to one embodiment of the present invention.

Referring to the drawings wherein identical reference numerals denote the same elements throughout the various views, FIG. 1 is a perspective view of an aircraft seat 10 having a fabric seat back tray 100 according to one embodiment of the present invention. Mounting brackets 12 are pivotally connected to seat 10 at each lateral side of seat 10. Mounting brackets 12 hinge at respective lower ends 14 between deployed and extended positions. In the extended position, as shown in FIG. 1, upper ends 16 of mounting brackets 12 extend rearward from seat back 18 of the seat 10 and serve as pivotal mounts for the tray 100. The manner in which the tray 100 is mounted to the seat 10 is conventional and is not further described.

As is also shown in FIG. 1, the tray 100 is movable between a stowed, locked position shown on the left seat 10, and a lowered use position shown on the right seat 10. A latch 20 holds the tray 100 in its locked position.

Figure 2:
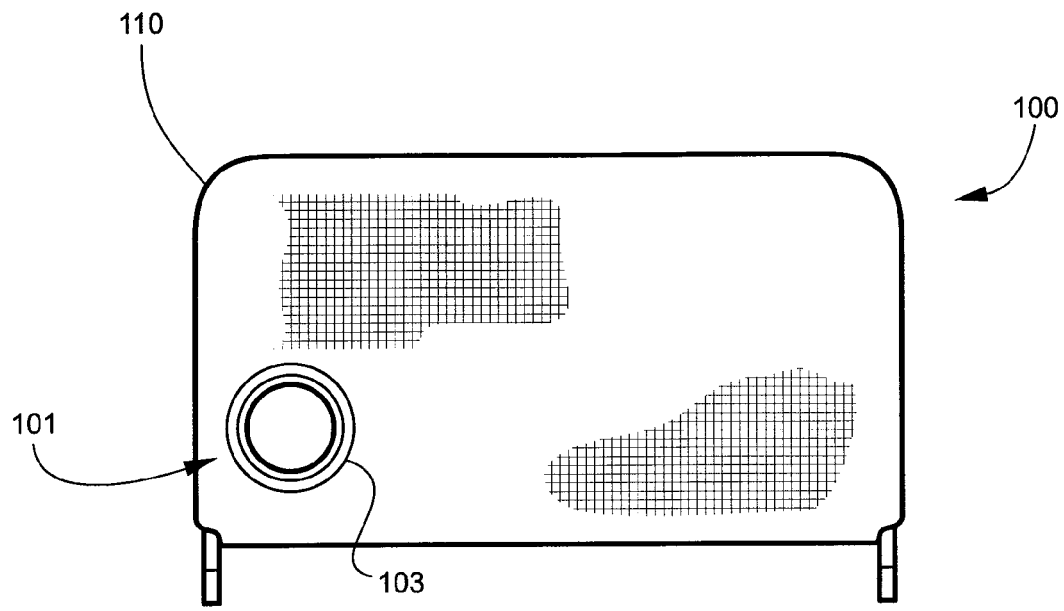
FIG. 2 is a top plan view of a fabric seat back tray according to FIG. 1.
Figure 3:
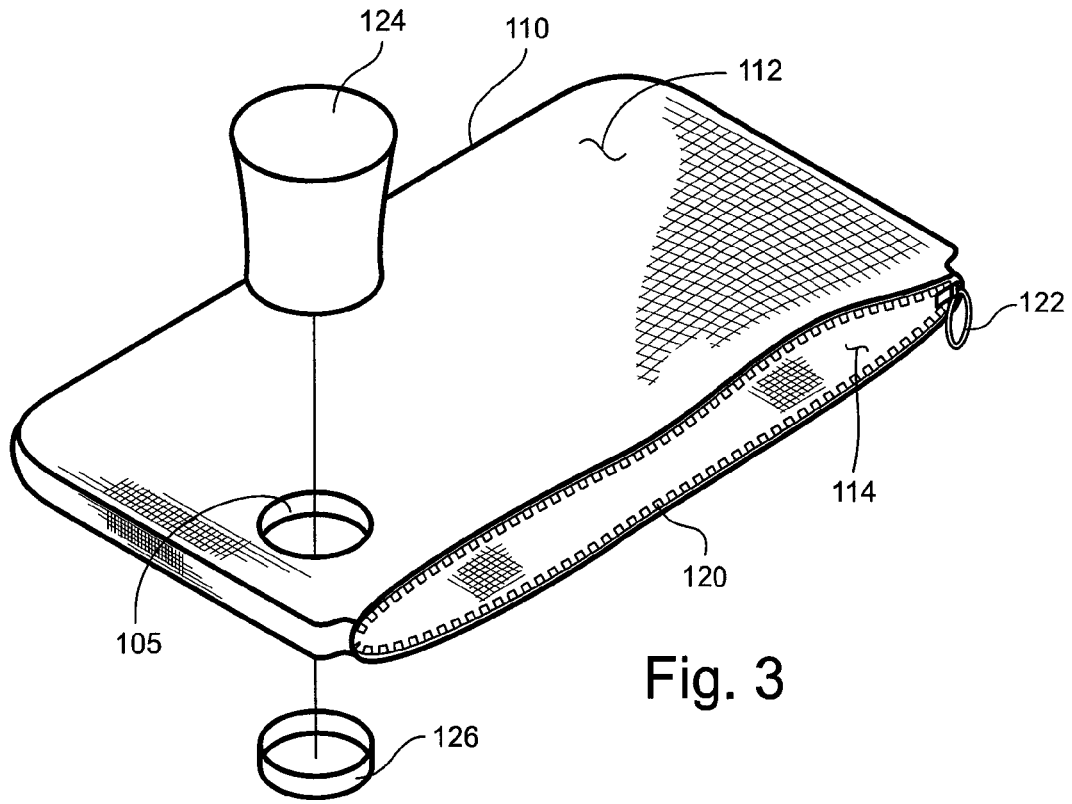
FIG. 3 is a perspective view of the fabric seat back tray of FIG. 2.

Referring now also to FIGS. 2 and 3, the fabric seat back tray 100 includes a sleeve 110 formed by stitching or otherwise bonding two fabric panels 112, 114 together along the lateral sides 104 and the distal side 106 to form the sleeve 110. The two fabric panels 112, 114 are positioned in a tensioned condition on a tray frame 300. The panel 112 thus forms the tray surface when the seat back tray 100 is in use As best shown in FIG. 3, the sleeve 110 has an open end proximate the seat back 18 that enables the sleeve 110 to be slipped in a tensioned condition onto the frame 300. A fastener, such as a zipper 120, permits the sleeve 110 to be fastened onto the frame 300. The zipper 120 may include a tab 122 for operating the zipper, but which may be removable when not in use to prevent tampering or unauthorized removal of the sleeve 110.

The cup holder 101 is formed in a opening 105 through one or both panels 112, 114, as shown in the illustrated example of FIGS. 1, 2 and 3 In the embodiment most clearly shown in FIG. 3, the cup holder 101 is formed of two complementary collars 124, 126 that are positioned through the opening seat back tray 100. The collars 124, 126 may be provided with screw threads, or bayonet fittings for locking them together to form a unitary rigid opening. Alternatively, the cup holder may be more simply fabricated from a ring set into the panel 112 of sufficient depth to prevent shifting of the cup. These or other alternatives may be utilized in order to provide suitable resistance to the cup sliding on the panel 112. In addition, the fabric from which the panels 112, 114 is fabricated may inherently have a higher coefficient of friction due to the irregular surface of the fabric, which will further inhibit movement of the cup during normal flight.

Figure 4:
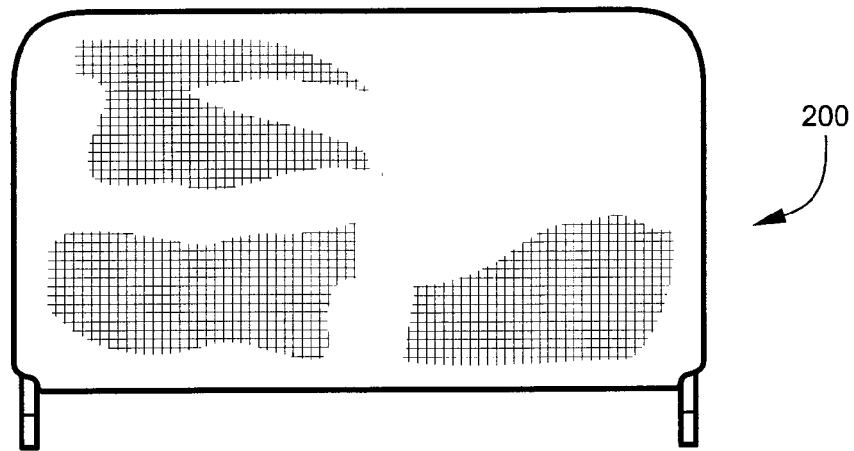
FIG. 4 is a top plan view of a fabric seat back tray embodiment without a cup holder feature.

Referring now to FIG. 4, fabric seat back tray 200 is constructed much like fabric seat back tray 100, but does not include a cup holder 101. As noted above, the irregular surface of the fabric may be sufficient to inhibit movement of the cup during normal flight without providing any form of indentation. Other possibilities include providing a tacky, high coefficient of friction pad onto which a cup may be placed.

Figure 5:
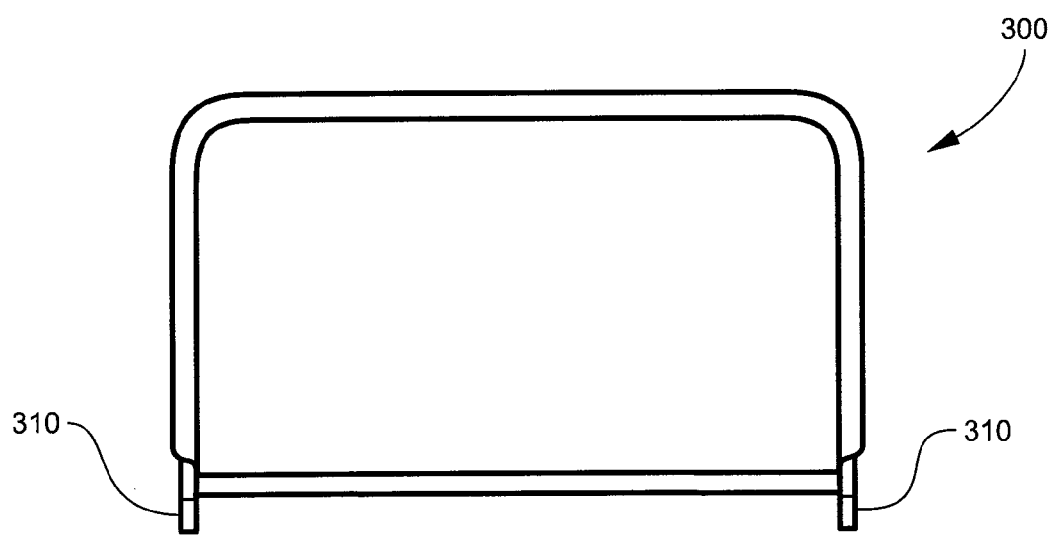
FIG. 5 is a top plan view of an uncovered tray frame of a type suitable for receiving and supporting the fabric seat back tray according to the invention.

Referring now to FIG. 5, the sleeve 110 is placed onto a tray frame 300, which has a generally rectangular shape with rounded corners to provide for passenger safety and to assist in guiding sleeve 110 onto frame 300.

Figure 6:
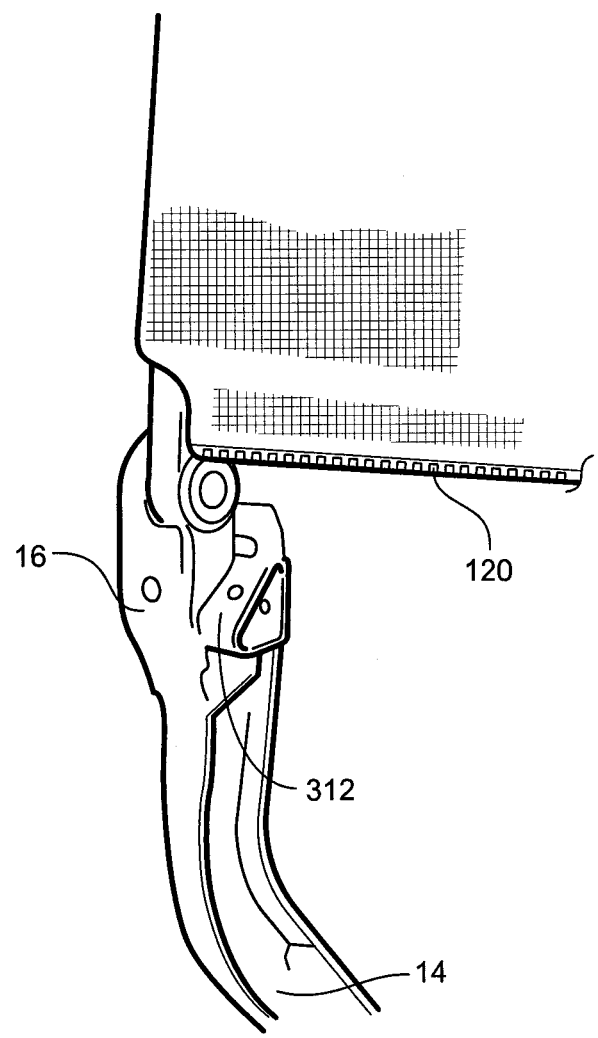
FIG. 6 is a fragmentary view of the tray frame of FIGS. 1, 2 and 3.
Figure 7:
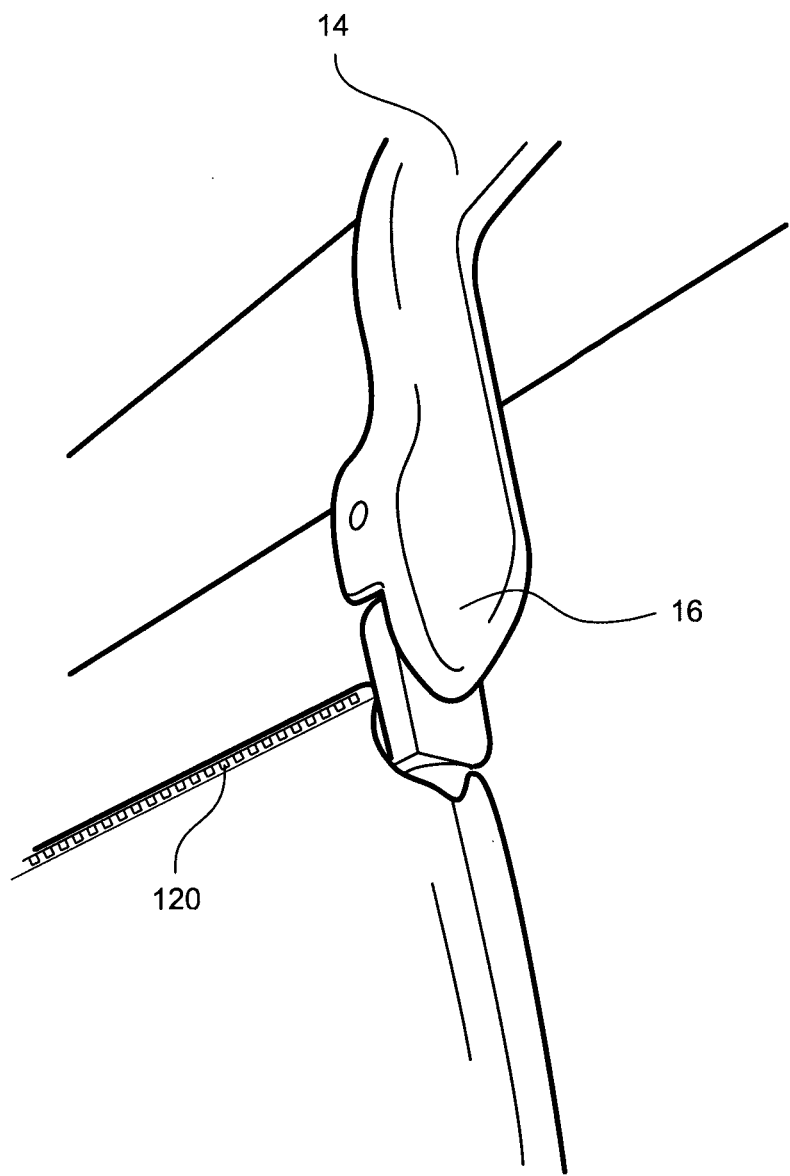
FIG. 7 is a perspective view of a tray frame and mounting bracket of the according to one embodiment of the invention.

As shown in FIGS. 6 and 7, fittings 310 include lever extensions 312 that abut inner stopping-surfaces of mounting brackets 12 when seat back tray 100 reaches its fully deployed position. For example, seat back tray 100 may be maintained at a nearly horizontal angle such as 3 degrees above horizontal for in-flight use. A set screw for adjusting the full deployment angle may be provided. A latch **releasably maintains the seat back tray in its generally vertical stowed position.

The fabric panels of sleeve 110 are constructed of natural or synthetic fibers that may be woven, knitted or nonwoven. Various fabrics may be selected according to various desired color schemes and textures. Liquid-absorbing or non-absorbent fabric may be chosen. The fabric may have elastic properties to facilitate tension in the surfaces of sleeve 110 to assure that upper fabric tray panel 112 provides a tight generally planar upper surface to support food items and other articles. Although sleeve 110 shown in the drawings is zippered about frame 300 for convenient installation and removal, other embodiments of fabric seat back trays according to the invention are stitched along all sides to enclose an inner frame without use of a zipper. Other closures such as hook-and-loop strips, buttons and corresponding button holes, and other snaps and clasps may be used as well. A rigid or semirigid filler may fill the space within sleeve 110 within the perimeter of the frame 300 provide rigidity to seat back tray 100.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. A seat back tray for being pivotally mounted to an aircraft seat, comprising:
   (a) a frame pivotally attached to the aircraft seat and movable between a stowed position against a seat back of the aircraft seat and a deployed horizontal position for use by an aft-seated occupant; and
   (b) a fabric sleeve formed of top and bottom panels held in a tensioned condition on the frame;
   wherein the seat back tray is devoid of a rigid tray table underlying the fabric sleeve.

2. A seat back tray according to claim 1, further comprising at least one releasable fastener for retaining the fabric sleeve on the frame and permitting removal of the fabric sleeve from the frame.

3. A seat back tray according to claim 1, further comprising an opening formed through at least the top panel of the fabric sleeve for receiving a cup holder insert therethrough.

4. A seat back tray according to claim 1, further comprising an opening formed through the top and bottom panels of the fabric sleeve for receiving a cup holder insert therethrough.

5. A seat back tray according to claim 1, wherein the top and bottom panels are stitched together along three sides and attached along one side by a zipper extending laterally along the one side of the fabric sleeve proximate the seat back for retaining the fabric sleeve on the frame.

6. A seat back tray according to claim 1, wherein the fabric sleeve is constructed of a fabric selected from the group consisting of woven, knitted and nonwoven fabrics.

7. An aircraft passenger seat including a seat back, and comprising:
   (a) a seat back tray pivotally mounted to the aircraft passenger seat;
   (b) the seat back tray including a frame movable between a stowed position against the seat back and a deployed horizontal position for use by an aft-seated occupant; and
   (c) a fabric sleeve formed of top and bottom fabric panels held in a tensioned condition on and supported by the frame, wherein the seat back tray is devoid of a rigid tray table underlying the fabric sleeve.

8. An aircraft passenger seat according to claim 7, further comprising at least one releasable fastener for retaining the sleeve on the frame and permitting removal of the sleeve from the frame when desired.

9. An aircraft passenger seat according to claim 7, and further comprising an opening formed through at least the top fabric panel of the fabric sleeve for receiving a cup holder insert therethrough.

10. An aircraft passenger seat according to claim 7, further comprising an opening formed through each of the top and bottom fabric panels of the fabric sleeve for receiving a cup holder insert therethrough.

11. An aircraft passenger seat according to claim 7, wherein the stop and bottom fabric panels are stitched along three sides and connected along a fourth side by a zipper extending laterally along the fourth side of the sleeve proximate the seat back for retaining the sleeve on the frame.

12. An aircraft passenger seat according to claim 7, wherein the fabric sleeve is constructed of a fabric selected from the group consisting of woven, knitted and nonwoven fabrics.

13. An aircraft passenger seat including a seat back and a seat back tray pivotally mounted to the seat back, the seat back tray comprising:
   (a) a frame movable between a stowed position against the seat back and a deployed horizontal position;
   (b) a fabric sleeve formed of top and bottom panels held in a tensioned condition on and supported by the frame, the top and bottom panels stitched along three sides and attached along a fourth side by a zipper, the fourth side positioned proximate the seat back; and
   (c) an opening formed through at least the top panel of the fabric sleeve for receiving a cup holder insert therethrough;
   wherein the seat back tray is devoid of a rigid tray table underlying the fabric sleeve.

14. An aircraft passenger seat according to claim 13, further comprising an opening formed through the bottom panel of the sleeve for receiving the cup holder insert therethrough.

\* \* \* \* \*

UNITED STATES PATENT AND TRADEMARK OFFICE
CERTIFICATE OF CORRECTION

| | | |
|---|---|---|
| PATENT NO. | : 8,936,308 B2 | Page 1 of 1 |
| APPLICATION NO. | : 13/810770 | |
| DATED | : January 20, 2015 | |
| INVENTOR(S) | : Petersen et al. | |

It is certified that error appears in the above-identified patent and that said Letters Patent is hereby corrected as shown below:

In the claims:

Column 4, Claim 11, line 60, delete "stop" insert --top--.

Signed and Sealed this
Thirtieth Day of June, 2015

Michelle K. Lee
*Director of the United States Patent and Trademark Office*